United States Patent [19]

Devlin et al.

[11] Patent Number: 5,930,686
[45] Date of Patent: *Jul. 27, 1999

[54] INTEGRATED TRANSCEIVER CIRCUIT PACKAGED COMPONENT

[75] Inventors: Liam Michael Devlin; Brian Jeffrey Buck, both of Northampton, United Kingdom

[73] Assignee: Marconi Electronic Systems Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/801,244

[22] Filed: Feb. 19, 1997

Related U.S. Application Data

[63] Continuation of application No. 08/223,588, Apr. 6, 1994, abandoned.

[30] Foreign Application Priority Data

May 5, 1993 [GB] United Kingdom .................. 9309206

[51] Int. Cl.⁶ ..................................................... H04B 1/40
[52] U.S. Cl. ................. 455/84; 455/78; 455/73; 455/302; 455/307; 257/728
[58] Field of Search .................. 455/73, 84, 78, 455/86, 302, 307, 338, 339, 260, 310, 76, 90, 109, 79, 333; 174/52.3; 361/820; 257/702, 728, 787

[56] References Cited

U.S. PATENT DOCUMENTS 4,170,756  10/1979  Shepperd .
4,501,018   2/1985  Shanley et al. .
4,792,939  12/1988  Hikita et al. .
4,910,481   3/1990  Sasaki et al. ............................... 455/73
5,031,233   7/1991  Ragan ...................................... 455/307
5,202,651   4/1993  Yoshimasu .
5,239,685   8/1993  Moe et al. ................................ 455/73
5,326,414   7/1994  Mosher et al. .......................... 156/242
5,373,265  12/1994  Davis et al. ............................. 455/109
5,392,461   2/1995  Yokoyama ................................ 455/90

FOREIGN PATENT DOCUMENTS 0166347    12/1980  Japan ....................................... 455/78
5769939     4/1982  Japan ....................................... 455/78
3226022    10/1991  Japan ....................................... 455/78
2041701     9/1979  United Kingdom .
WO-A-85/
  00481     1/1985  WIPO .

OTHER PUBLICATIONS

Garry, Greg, "EBN Update : Fujistu , Level One Claim Success"; *Electronic Buyers' News*, p. 2, Dec. 1991.

Proceedings of the Nineteenth International Symposium on Gallium Arsenide and Related Compounds, Karuizawa, Japan, Sep. 28–Oct. 2, 1992:"High performance, low cost GaAs MIMICS for personal phone applications at 1.9 GHz", Figure 1, pp. 911–916.

*Primary Examiner*—Doris H. To
*Attorney, Agent, or Firm*—Kirschstein, et al.

[57] ABSTRACT

An integrated transceiver circuit packaged component including a transceiver circuit having a bandstop filter (29) provided therein for filtering both the received and transmitted signals to remove unwanted components therefrom.

13 Claims, 2 Drawing Sheets

5,930,686

INTEGRATED TRANSCEIVER CIRCUIT PACKAGED COMPONENT

This application is a continuation of application Ser. No. 08/223,588, filed on Apr. 6, 1994, which is now abandoned.

BACKGROUND OF THE INVENTION

This invention relates to an integrated transceiver circuit packaged component.

One known such component is shown in FIG. 1 of the accompanying drawings together with an external filter 1. The transceiver has two modes of operation, transmit and receive. In both modes a local oscillator signal is generated by an on-chip voltage controlled oscillator (VCO) 3.

In the receive mode signals enter the transmit/receive (T/R) common port 5 at the RF frequency. The signal level is boosted by the low noise amplifier (LNA) 7 with the addition of very little noise. The off-chip band pass filter 1 then rejects all of the noise power at the image frequency (local oscillator frequency (LO)–intermediate frequency (IF), for an RF signal at LO+IF). Without filter 1 the image noise power would be down-converted to the IF along with the signal (and noise) at the RF frequency. A mixer 9 multiplies the RF and VCO signals and generates an IF signal at a frequency RF–LO (assuming RF is greater than LO). The IF signal is then amplified by a differential amplifier 11 prior to its output at port 13.

In the transmit mode a differential input signal at the IF frequency is input at port 15 and amplified by differential amplifier 12. Mixer 9 multiplies the output of amplifier 12 with the VCO signal to generate two 'sidebands' at LO–IF and LO+IF. Assuming the RF signal is at LO+IF, then this is the wanted sideband and the LO–IF signal is termed the unwanted sideband. Filter 1 is used to reject the unwanted sideband and any other spurious mixing products/harmonics. The wanted RF signal is then routed back on chip and through a power amplifier 17 prior to output at the T/R common port 5.

The transceiver circuit further comprises an amplifier 23 connected to the output of VCO 3 for providing a phase locked loop (PLL) drive at output port 25 of the package.

With reference to FIG. 2 of the accompanying drawings, microwave integrated circuits (MICs) have a number of ground points all connected to a common ground plane. In the case of monolithic MICs (MMICs) this is normally the back side of the chip. When packaged it is normal to provide a low inductance ground (such as a metal based package) for the common chip ground. The inductance between the chip ground (internal to the package) and the circuit ground (external to the package) is termed the common lead ground inductance.

A fraction of the output signal is fed directly back to the input. At low frequencies, where the reactance of $L_{COMMON}$ is small, this has minimal effect, but as the frequency of operation increases so the reactance of $L_{COMMON}$ and hence the level of feedback increases. The presence of $L_{COMMON}$ causes feedback between each and every pin of the package. Differential signals do not suffer from this problem, only single-ended signals.

The transceiver configuration of FIG. 1 suffers from problems relating to common lead grounding inductance when low cost packaging is used. Common lead inductance serves to act as series feedback between each and every pin of the transceiver package. Just 0.2 nH will act as −20 dB of feedback (considering 50 ohm source and load impedances) at 2.4 GHz (the USA's ISM band). This causes the following problems:

1. Potential for instability in both transmit and receive paths as a result of loop gains greater than unity between port 5 and port 19 (the port by means of which filter 1 is connected to amplifiers 7, 17).
2. Degradation of filter performance as a result of low-isolation between port 19 and port 21 (the port by means of which filter 1 is connected to mixer 9).
3. Appreciable levels of transmit power fed back to the PLL drive port 25 (can cause a radio to loose lock).

One possible solution to these problems is to provide each ground connection point on the chip with an individual package pin for connection to the external ground. With circuits containing high levels of functionality, as the transceiver of FIG. 1, this results in a requirement for a package with a prohibitively large number of pins. Both cost and size of the end component are increased.

SUMMARY OF THE INVENTION

According to the present invention there is provided an integrated transceiver circuit packaged component including a transceiver circuit having a filter provided therein for filtering both the received and transmitted signals to remove unwanted components therefrom.

Preferably, the filter is a bandstop filter.

BRIEF DESCRIPTION OF THE DRAWING

An integrated transceiver circuit packaged component in accordance with the present invention will now be described, by way of example, with reference to the accompanying drawings, in which.

DETAILED DESCRIPTION OF THE PREFERRED EMBODIMENTS

Figure 1:
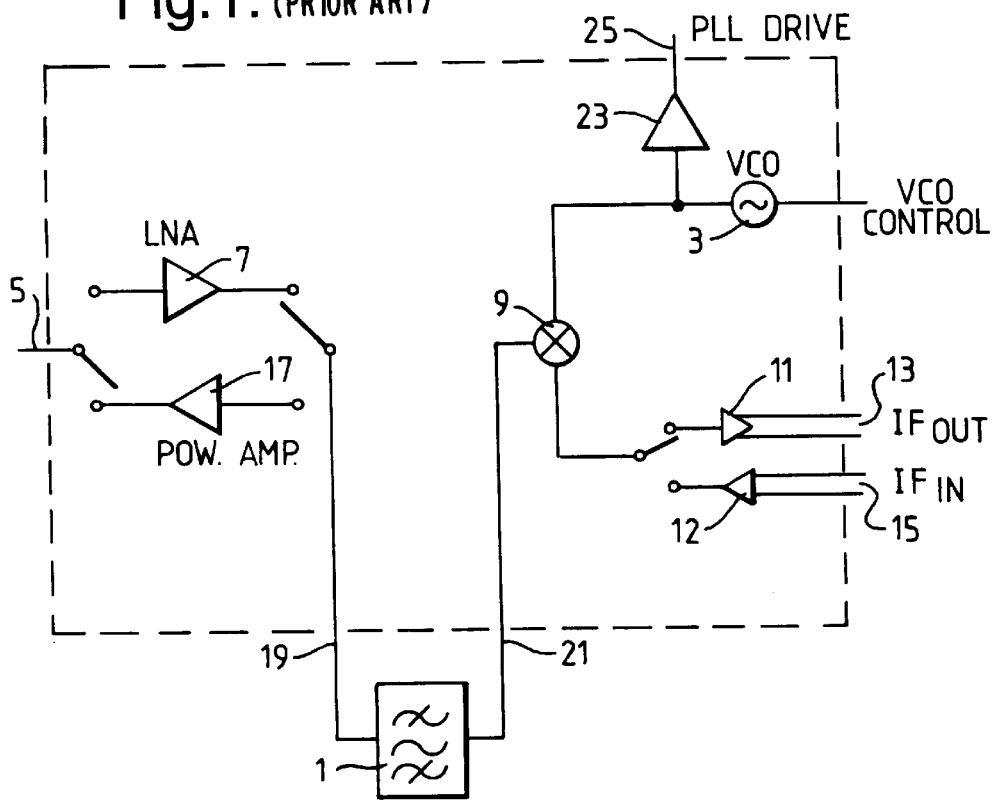
FIG. 1 is a circuit diagram of a prior art such component together with external filter.
Figure 2:
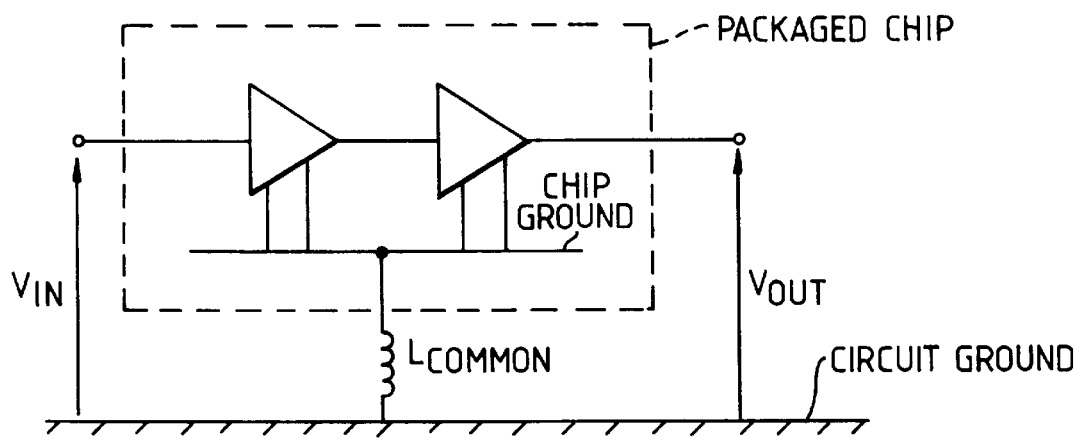
FIG. 2 illustrates the problem of common lead grounding inductance which occurs with the transceiver of FIG. 1.
Figure 3:
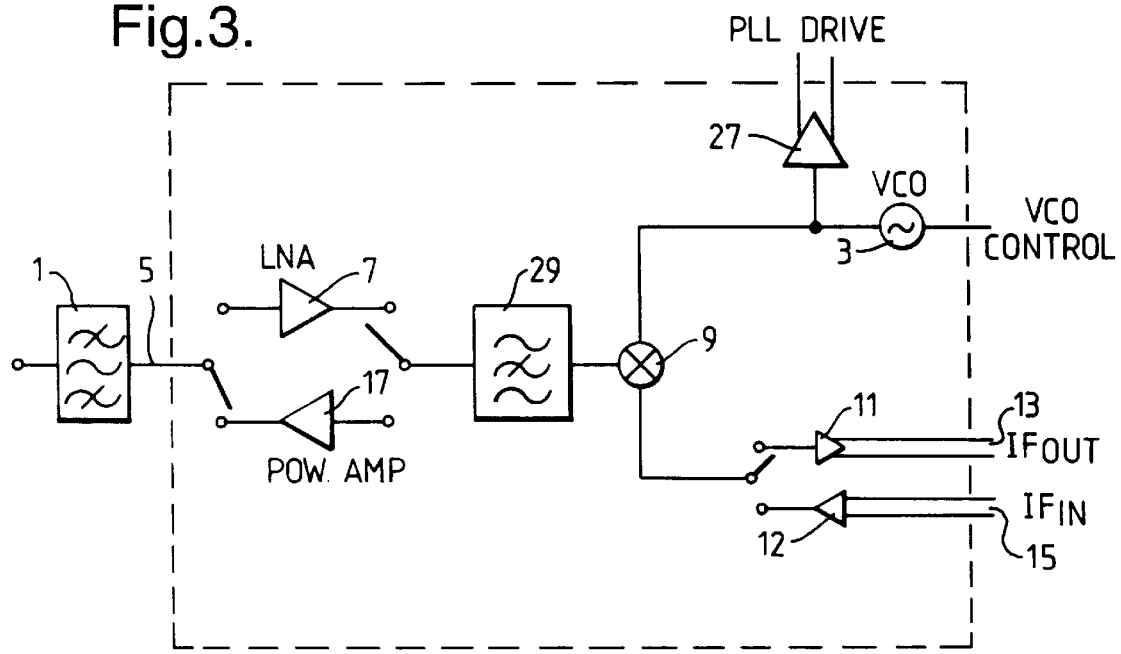
FIG. 3 is a circuit diagram of the component according to the present invention together with an external filter.

In the transceiver circuit of FIG. 3 the same components as those of the circuit of FIG. 1 are labelled with the same reference numerals.

Figure 4:
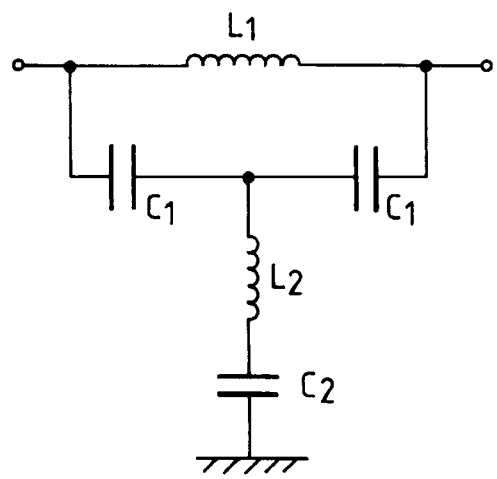
FIG. 4 shows the circuit of a bandstop filter of the component of FIG. 3.

With a view to overcoming problems 1 to 3 above the circuit of FIG. 1 has been modified. A differential drive is used for the PLL. This will eliminate any RF signals which would be fed back in common mode. Thus, amplifier 23 of FIG. 1 has been replaced by differential amplifier 27 of FIG. 3. Filter 1 has been moved to the T/R common port 5 of the chip and an on-chip, bandstop filter 29 with more modest rejection of the image/unwanted sideband signals has been added between the amplifiers 7, 17 and mixer 9. Greater than 10 dB is sufficient to give significant immunity to image noise on receive and to avoid saturation of the power amplifier 17 on transmit. A suitable compact circuit for the bandstop filter 29 comprising a combination of series and shunt bandstop L, C elements is shown in FIG. 4. Filter 29 rejects the image/unwanted sideband (at frequency LO−IF) but does nothing to reject harmonics/spurious responses at other frequencies. The band pass filter 1 at the T/R common port 5 serves this purpose. Further, any external ground returns from the circuitry at the control port of the VCO 3 should be eliminated.

The transceiver architecture of FIG. 3 is much more tolerant to common lead ground inductance. The only single-ended signals coming from the chip are from the T/R common port 5, that is not more than one single-ended signal is input to/output by the chip in either mode of operation. Because all other inputs/outputs are differential or DC/control, the chip is very tolerant to portions of the single-ended signal at the common port 5 being fed back to other ports as a result of the common lead ground inductance. Thus, low cost plastic packaging can be used.

If a transceiver chip were fabricated which used an off-chip local oscillator drive, the differential drive the PLL would not be required nor would the elimination of the external ground returns from the local oscillator control circuitry, although the local oscillator drive would need to be either differential or at a very low signal level to avoid saturation of the low noise amplifier 7 in receive mode.

If an on-chip resonator and varactor were used then the aforementioned elimination of external ground returns would be observed by default. If an on-chip balanced VCO were used, ground connections could be made at virtual earth points without causing RF current to flow in the common lead inductance.

We claim:

1. An integrated transceiver circuit packaged component comprising: a transceiver circuit having a bandstop filter, a common input/output port and an up converter/down converter, the bandstop filter being located between the common input/output port and the up converter/down converter and filtering both signals received and signals transmitted by the transceiver circuit to filter out unwanted sideband $F_{LO}-F_{IF}$ wherein the transceiver circuit and the bandstop filter are integrated onto a single chip in order to increase isolation between the common port and the up converter/down converter.

2. The component according to claim 1, wherein the up converter/down converter comprises a mixer for mixing a locally generated frequency with the received signals when the transceiver circuit is being used in receive mode and with the transmitted signals when the transceiver circuit is being used in transmit mode.

3. The component according to claim 2, wherein the transceiver circuit includes between an intermediate frequency output thereof and the mixer a first differential amplifier, and between an intermediate frequency input thereof and the mixer a second differential amplifier, the transceiver circuit further including further switch means between the first and second differential amplifiers and the mixer by means of which the mixer is connected to at least one of the first and second differential amplifiers, the first and second differential amplifiers being operable to amplify the received and transmitted signals respectively.

4. The component according to claim 2, wherein the transceiver circuit includes a voltage controlled oscillator for providing to the mixer the locally generated frequency.

5. The component according to claim 4, wherein the transceiver circuit has a phase locked loop (PLL) drive output and includes connected thereto a PLL differential amplifier for providing a signal at the PLL drive output by amplifying a signal derived from the voltage controlled oscillator.

6. The component according to claim 2, wherein the transceiver circuit includes between the bandstop filter and the common input/output port a low noise amplifier for amplifying the received signals, a power amplifier for amplifying the transmitted signals, and switch means for connecting at least one of the low noise amplifier and the power amplifier between the filter and the common input/output port.

7. The component according to claim 6, wherein the transceiver circuit includes between an intermediate frequency output thereof and the mixer a first differential amplifier, and between an intermediate frequency input thereof and the mixer a second differential amplifier, the transceiver circuit further including further switch means between the first and second differential amplifiers and the mixer by means of which the mixer is connected to at least one of the first and second differential amplifiers, the first and second differential amplifiers being operable to amplify the received and transmitted signals respectively.

8. The component according to claim 6, wherein the bandstop filter rejects the unwanted sideband $F_{LO}-F_{IF}$ to avoid saturation of the power amplifier on transmitting signals.

9. The component according to claim 8, wherein the bandstop filter rejects image noise on receiving signals.

10. The component according to claim 1, wherein the bandstop filter rejects image noise on receiving signals.

11. The component according to claim 1, which is packaged in plastic.

12. The component according to claim 1, wherein the transceiver operates in the region of the ISM band.

13. The component according to claim 1, in combination with a bandpass filter connected to the common input/output port for filtering both the received and transmitted signals.

* * * * *